US008453141B1

(12) United States Patent
Poole (10) Patent No.: US 8,453,141 B1
(45) Date of Patent: May 28, 2013

(54) HIGH PERFORMANCE INSTALL UPDATE (75) Inventor: James Poole, Oviedo, FL (US)

(73) Assignee: Symantec Corporation, Mountain View, CA (US)

( * ) Notice: Subject to any disclaimer, the term of this patent is extended or adjusted under 35 U.S.C. 154(b) by 1018 days.

(21) Appl. No.: 12/362,234

(22) Filed: Jan. 29, 2009

(51) Int. Cl.
*G06F 9/445* (2006.01)
*G06F 9/44* (2006.01)

(52) U.S. Cl.
USPC ............ 717/175; 717/169; 717/170; 717/177

(58) Field of Classification Search
None
See application file for complete search history.

(56) References Cited

U.S. PATENT DOCUMENTS

| | | |
|---|---|---|
| 5,155,847 A | 10/1992 | Kirouac et al. |
| 5,421,009 A | 5/1995 | Platt |
| 5,473,772 A | 12/1995 | Halliwell et al. |
| 5,493,682 A | 2/1996 | Tyra et al. |
| 5,555,416 A | 9/1996 | Owens et al. |
| 5,790,796 A | 8/1998 | Sadowsky |
| 6,123,737 A | 9/2000 | Sadowsky |
| 6,292,941 B1* | 9/2001 | Jollands ...................... 717/176 |
| 7,069,317 B1 | 6/2006 | Colrain et al. |
| 7,313,792 B2* | 12/2007 | Buban et al. .................. 717/170 |
| 7,363,623 B2* | 4/2008 | Kishida ........................ 717/174 |
| 7,412,700 B2* | 8/2008 | Lari et al. ...................... 717/175 |
| 7,600,225 B2* | 10/2009 | Sliger et al. ................... 717/169 |
| 2003/0078959 A1* | 4/2003 | Yeung et al. ................... 709/201 |
| 2005/0166196 A1* | 7/2005 | Grier et al. .................... 717/162 |
| 2005/0172284 A1* | 8/2005 | Dandekar et al. ............. 717/175 |
| 2006/0225072 A1* | 10/2006 | Lari et al. ..................... 717/175 |
| 2008/0276234 A1* | 11/2008 | Taylor et al. .................. 717/177 |
| 2009/0282401 A1* | 11/2009 | Todorova ..................... 717/175 |

OTHER PUBLICATIONS

Microsoft Corporation ,"How to configure and use Automatic Updates in Windows XP", Microsoft, Inc., downloaded from http://support.microsoft.com/kb/306525, Dec. 5, 2007, 4 pages.

* cited by examiner

*Primary Examiner* — Thuy Dao
(74) *Attorney, Agent, or Firm* — Rory D. Rankin; Meyertons, Hood, Kivlin, Kowert & Goetzel, P.C.

(57) ABSTRACT

A computer system and method for installing a software product. A computer system includes a client coupled to a server. The client obtains an installation package of files to be used to install the software product and for each file, determines if there is a later file version available. The client creates a temporary folder. For each file, if a later version is not available, the client adds a link to the temporary folder that refers to the file in the installation package and if a later version of a file is available, adds a link to the temporary folder that refers to the later version of the file. The client executes an installation operation on the temporary folder. For only those files for which a later file version is available, the client may add links that refer to files downloaded from a server and stored in an update folder.

20 Claims, 7 Drawing Sheets

HIGH PERFORMANCE INSTALL UPDATE

BACKGROUND OF THE INVENTION

1. Field of the Invention

This invention relates to computer systems and, more particularly, to installation of software components on computer systems.

2. Description of the Related Art

It is common practice for individuals and enterprises to enhance and improve the capabilities of computer systems by installing new or updated software components from time to time. However, due to the complexity inherent in modern software components, even the latest versions of software may require the application of up-to-the-minute updates and/or bug fixes. Often, updates are necessary to ensure that a software product complies with the latest security and functional specifications. For example, many vendors suggest that customers check for updates immediately after installing new software. Typically, a user obtains a complete image of the desired software and executes the installation. Then, the user checks for a later version of one or more components of the software via the internet or other network connection, downloads any available updates, and patches the installed software in place or, if necessary, performs a completely fresh installation. Unfortunately, if a security update is needed, the time between an initial installation and application of a patch may present a window of security vulnerability. Also, it is not uncommon for users to forget to check for updates and leave their software out-of-date and vulnerable.

In addition, there may be times when defects are discovered in a software product installer itself, complicating the process of installing a fix, especially if the product is being installed from static media (e.g., CD or DVD) or from a commonly used network share. The approach described above may not be suitable for defects that affect the installer itself. In addition, any of the above scenarios may require the performance of time and resource-wasting multiple installations. For example, prior to installation, a system or user, automatically or manually, may check for a newer version of the install image via the Internet. If a newer version is available, a complete replacement image may be downloaded and executed. All of the above solutions may waste time and system resources, especially in enterprises that support large numbers of computer systems. In addition, various subscription-based programs may be employed to update previously installed programs, such as Symantec LiveUpdate. However, these programs may be unsuitable for applying updates at install time.

In view of the above, an effective system and method for ensuring that the latest versions of software are available for installation that accounts for these issues are desired.

SUMMARY OF THE INVENTION

Various embodiments of a computer system and methods are disclosed. In one embodiment, a computer system includes a client coupled to at least one server. The client obtains an installation package of files to be used to install a software product on the client. The client determines for each file if there is a later file version available. The client creates a temporary folder. For each file, if a later version is not available, the client adds a link to the temporary folder that refers to the file in the installation package and if a later version of a file is available, adds a link to the temporary folder that refers to the later version of the file. The client executes an installation operation using links in the temporary folder.

In a further embodiment, the installation package is stored on one or more DVDs or CD-ROMs. In a still further embodiment, the client downloads and stores in an update folder, a later version of only those files for which a later file version is available from one or more servers and one or more links refer to later versions of files stored in the update folder. In another embodiment, links in the temporary folder are symbolic links.

In a still further embodiment, the installation operation includes an installer installing the software product using the installation package. In a still further embodiment, one or more files for which a later file version is available are part of the installer. In a still further embodiment, installing the software product on the client does not require installation of files in the installation package for which a later file version is available.

These and other embodiments will become apparent upon consideration of the following description and accompanying drawings.

BRIEF DESCRIPTION OF THE DRAWINGS

FIG. 7 illustrates one embodiment of a process that may be used to install a software product using the latest file versions While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION

Figure 1:
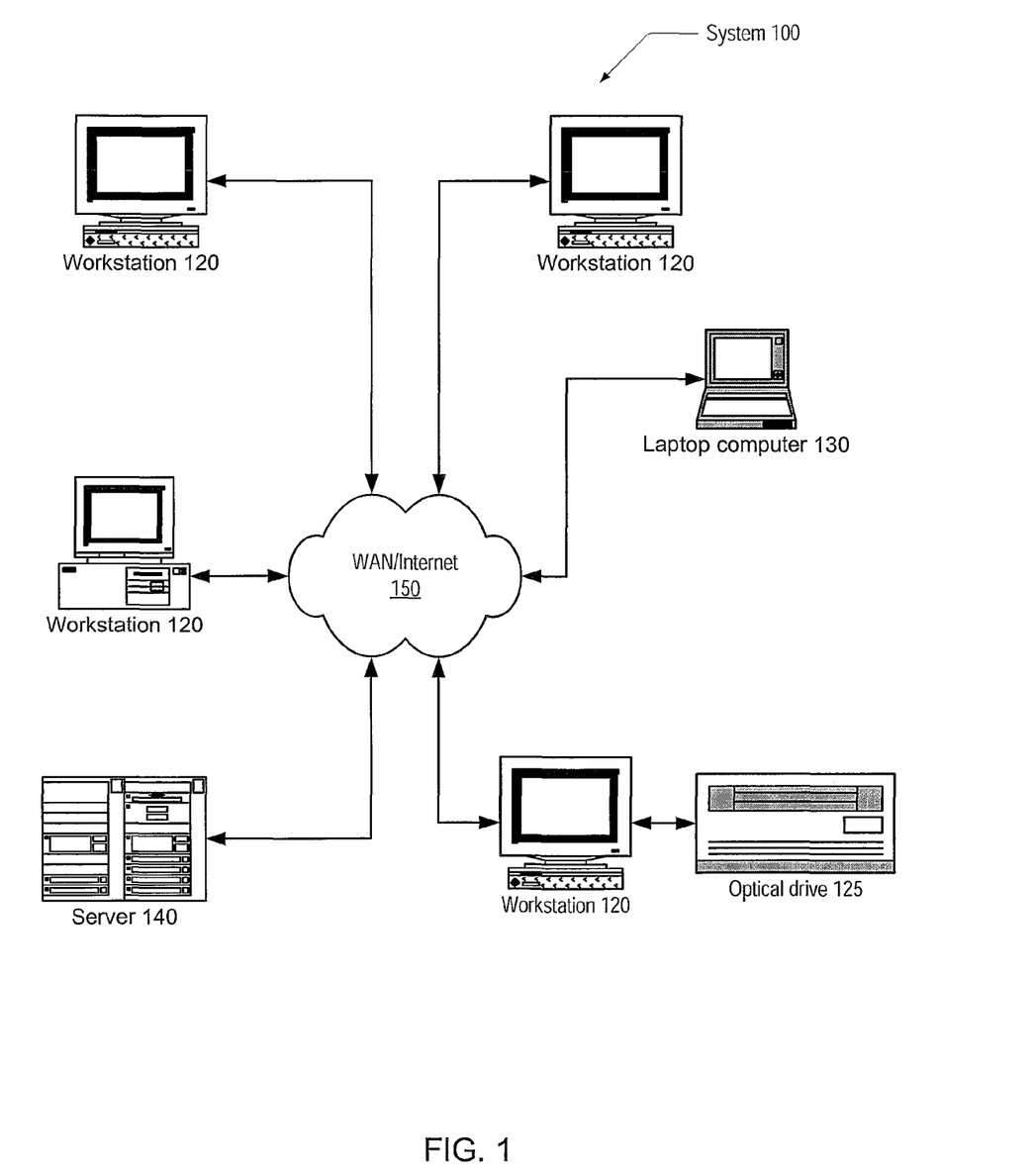
FIG. 1 illustrates one embodiment of a computer system.

FIG. 1 illustrates one embodiment of a computer system 100. As shown, system 100 includes one or more workstations 120, laptop computers 130, and at least one server 140 interconnected via a network 150 such as a WAN or the Internet. Workstations 120 are representative of any number of stationary computers. Laptop computers 130 are representative of any number of mobile client computing devices such as laptops, handheld computers, etc. Both workstations and laptop computers may operate as peers in a peer-to-peer configuration or as clients and servers in a client/server configuration.

In alternative embodiments, the number and type of workstations, laptop computers, and networks is not limited to those shown in FIG. 1. Almost any number and combination of servers, workstations, and laptop computers may be interconnected in system 100 via various combinations of modem banks, direct LAN connections, wireless connections, WAN links, etc. Also, at various times one or more workstations and/or laptop computers may operate offline. In addition, during operation, individual computer connection types may change as mobile users travel from place to place connecting, disconnecting, and reconnecting to system 100. In addition, any of workstations 120 or laptop computers 130 may be coupled to an optical drive 125 or another storage device capable of receiving removable media.

During operation of system 100, software updates to any of workstations 120 or laptop computers 130 may be installed. In one embodiment, software updates may be obtained from server 140 via the Internet 150. Alternatively, software updates may be obtained on static media and loaded into optical drive 125 for installation on any of workstations 120 or laptop computers 130. The discussions that follow may refer to install media. It is to be understood that install media may refer either to a set of installable files that are made available on static media or downloaded from a network.

Figure 2:
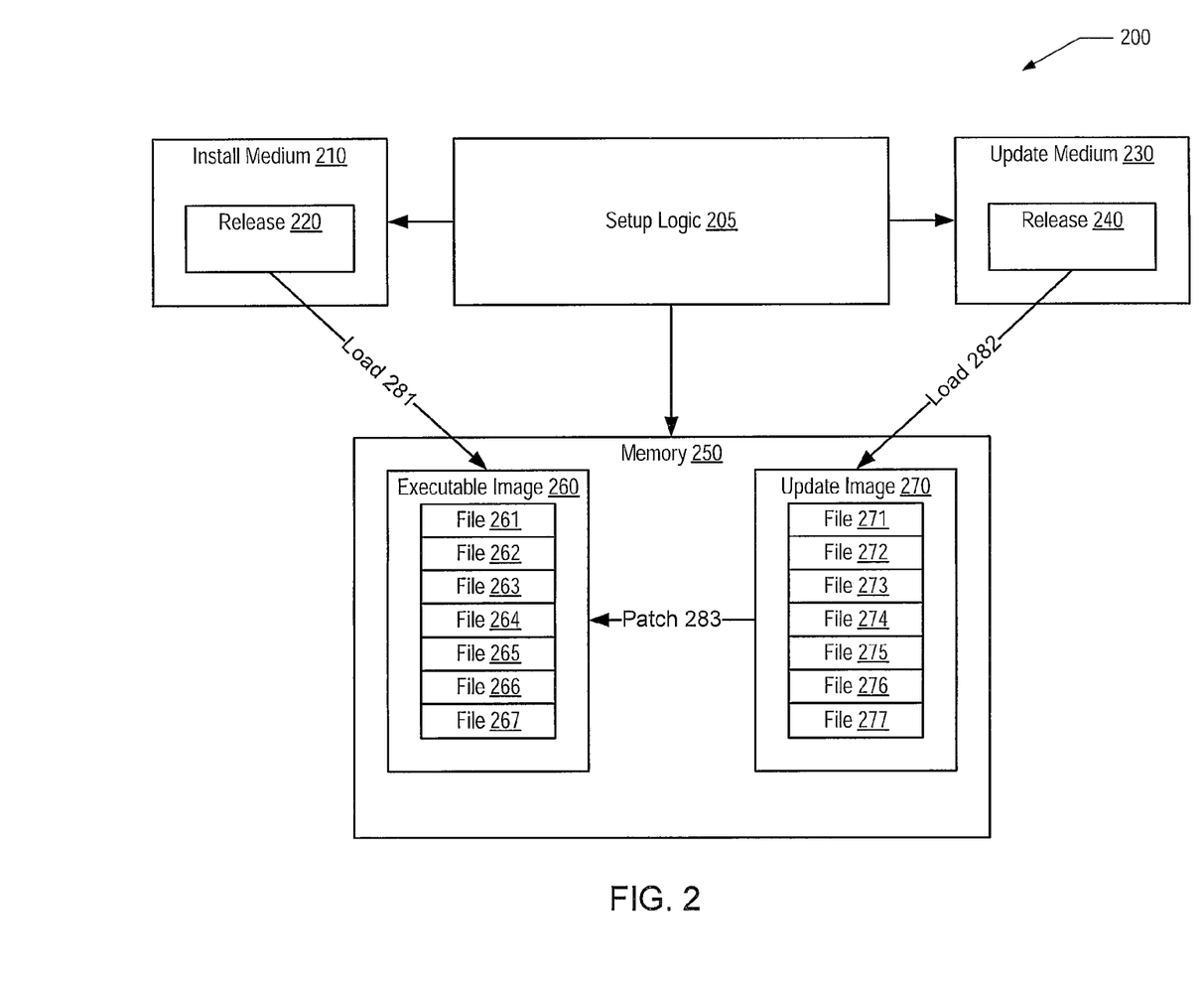
FIG. 2 illustrates one embodiment of a prior art software installation mechanism.

Turning now to FIG. 2, one embodiment of a prior art software installation mechanism 200 is shown. In the illustrated embodiment, mechanism 200 includes setup logic 205, an install medium 210, and an update medium 230, which are shown coupled to a memory 250. Mechanism 200 may operate within a computer system such as any of workstations 120 or laptop computers 130 as shown in FIG. 1. Setup logic 205 may include an installer framework and/or other logic that may be used to install, maintain, or remove (uninstall) software on any of workstations 120 or laptop computers 130. Memory 250 may be a region of data storage provided within any of workstations 120 or laptop computers 130 for the use of setup logic 205. In one embodiment, install medium 210 may include a release 220 of a particular software product installation package and update medium 230 may include a release 240, where release 240 is an updated version of release 220.

During an install operation, a new release of software may be installed and updated as follows. Initially, a copy of release 220 may be obtained via load path 281 to create an executable image 260 within memory 250. Image 260 may include files 261-267, as shown, or any number of files to be used during installation of the particular software package. Setup logic 205 may determine whether or not each of files 261-267 is a copy of the latest version available. If no newer versions are available, image 260 may be executed to install the particular software package. If there is a newer version of one or more of files 261-267, a copy of each newer version may be obtained via load path 282 to create an update image 270 within memory 250. Image 270 may include files 271-277, as shown, or any number of files to replace the older files that are to be used during installation of the particular software package. Once image 270 has been stored in memory 250, Setup logic 205 may cause a patch operation 283 to be executed to replace older versions of files 261-267 with newer versions 271-277. Once patch operation 283 is complete, image 260, as patched, may be executed by setup logic 205 to install the particular software package. It is noted that although in the illustrated embodiment, images 260 and 270 include the same number of files, in alternative embodiments update image 270 may include more or fewer files than executable image 260, depending on whether or not newer versions of files 261-267 are available.

Figure 3:
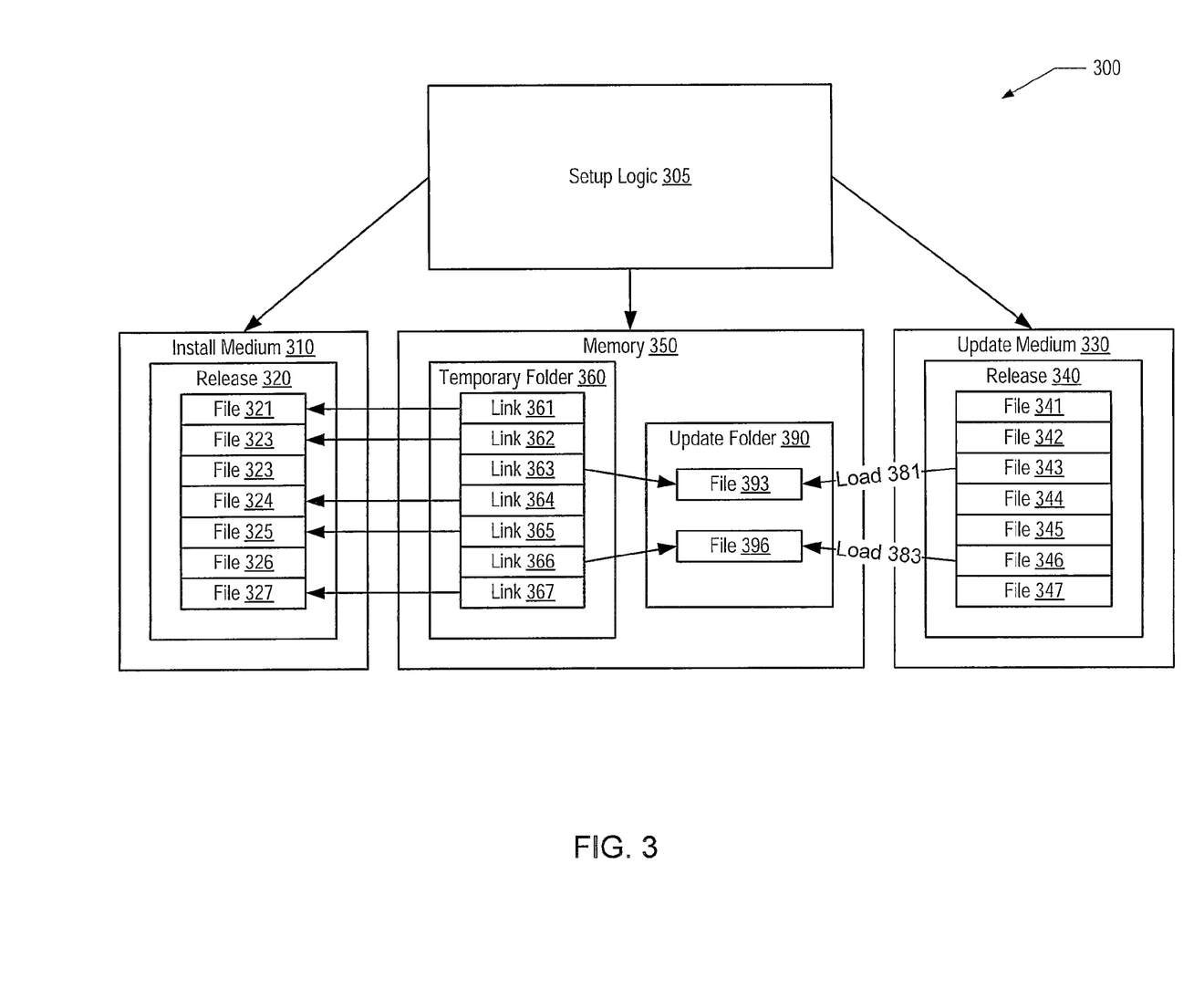
FIG. 3 illustrates one embodiment of a software installation mechanism.

FIG. 3 illustrates one embodiment of a software installation mechanism 300. In the illustrated embodiment, mechanism 300 includes setup logic 305, an install medium 310 and an update medium 330, which are shown coupled to a memory 350. Mechanism 300 may operate within a computer system such as any of workstations 120 or laptop computers 130 as shown in FIG. 1. Setup logic 305 may include an installer framework and/or other logic that may be used to install, maintain, or remove (uninstall) software on any of workstations 120 or laptop computers 130. Memory 350 may be a region of data storage provided within a computer system such as any of workstations 120 or laptop computers 130 for the use of setup logic 305. In one embodiment, install medium 310 may include a release 320 of a particular software installation package and update medium 330 may include a release 340, where release 340 is an updated version of release 320. Release 320 may include files 321-327, as shown, or any number of files to be used during installation of the particular software package. Release 340 may include files 341-347 as shown, or any number of newer files that are available to replace files in release 320. In addition to newer replacement files, release 340 may include files to be added to release 320.

During an installation, a new release of a software product may be installed as follows. Setup logic 305 may cause a temporary folder 360 and an update folder 390 to be created within memory 350. Setup logic 305 may then determine for each of files 321-327 whether or not there is a more recent version available. More recent versions of files may be downloaded from release 340 to update folder 390. For example, in the illustrated embodiment, files 393 and 396 may be downloaded via load 381 and load 383, respectively from release 340, where file 393 is s copy of file 343 and files 396 is a copy of file 346. Although files 393 and 396 are shown as being copies of files included in a single release 340, it is noted that in alternative embodiments, a different number of files may be downloaded to update folder 390 from release 340 or any number of additional releases that include more recent versions of the files to be used during the installation. Once the more recent versions of files are available in either install medium 310 or update folder 390, setup logic may then create links 361-367 within temporary folder 360. Links 361-367 may point to the more recent versions of files to be used during the installation from either install medium 310 or update folder 390. For instance, as shown, links 361, 362, 364, 365, and 367 may point to files 321, 322, 324, 325, and 327, respectively in release 320 and links 363 and 366 may point to files 393 and 396, respectively in update folder 390. Once links 361-367 have been created in temporary folder 360, setup logic 305 may execute installation of the associated software product, following the links to the more recent file versions to be used for installation.

Figure 4:
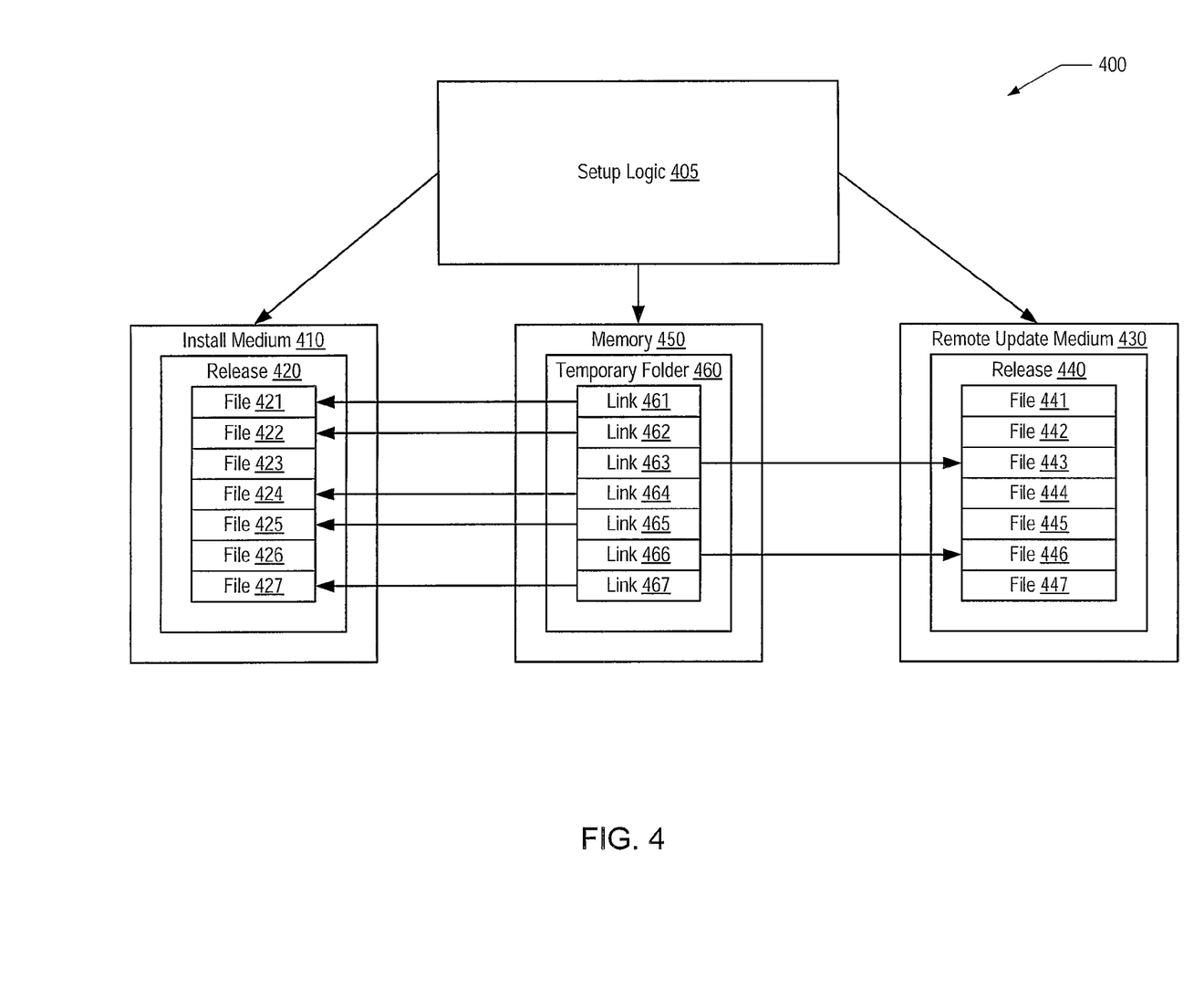
FIG. 4 illustrates an alternative embodiment of a software installation mechanism.

FIG. 4 illustrates an alternative embodiment of a software installation mechanism 400. In the illustrated embodiment, mechanism 400 includes setup logic 405, an install medium 310 and a remote update medium 430, which are shown coupled to a memory 450. Mechanism 400 may operate within a computer system such as system 100 as shown in FIG. 1. Setup logic 405 may include an installer framework and/or other logic that may be used to install, maintain, or remove (uninstall) software on any of workstations 120 or laptop computers 130. Memory 450 may be a region of data storage provided within a computer system such as any of workstations 120 or laptop computers 130 for the use of setup logic 405. In one embodiment, install medium 410 may include a release 420 of a particular software installation package and remote update medium 430 may include a release 440, where release 440 is an updated version of release 420. Release 420 may include files 421-427, as shown, or any number of files to be used during installation of the particular software package. Release 440 may includes files 441-447 as shown, or any number of more recent files that are available to replace files in release 420.

During an installation, a new release of a software product may be installed as follows. Setup logic 405 may cause a temporary folder 460 to be created within memory 450. Setup logic 405 may then determine for each of files 421-427 whether or not there is a more recent version available. More recent versions of files may be identified within release 440 via a query to remote update medium 430. For example, in the illustrated embodiment, files 443 and 446 may be updated copies of files 423 and 426, respectively. Although files 443 and 446 are shown as being copies of files included in a single release 440, it is noted that in alternative embodiments, a different number of updated files may be available from one or more additional releases. Once the more recent versions of files have been identified, setup logic may then create links 461-467 within temporary folder 460. Links 461-467 may point to the more recent versions of files to be used during the installation from either install medium 410 or remote update medium 430. For instance, as shown, links 461, 462, 464, 465, and 467 may point to files 421, 422, 424, 425, and 427, respectively in release 420 and links 463 and 466 may point to files 443 and 446, respectively in remote update medium 430. Once links 461-467 have been created in temporary folder 460, setup logic 405 may execute installation of the associated software product, following the links to the more recent file versions to be used for installation.

In one embodiment links 361-367 and/or 461-467 may be symbolic links as defined by the POSIX operating system standard. More particularly, each link may be a special type of file that includes a reference to another file or directory in the form of an absolute or relative path. Links may behave in a transparent manner such that the installation portion of setup logic 305 or 405 appears to be operating on the file to which the link points. A link may point to a file in different directory and on a different volume from the one that includes the link itself. In an alternative embodiment, links 361-367 may be POSIX-compliant hard links that refer to files stored on the same file system as update folder 360. In further embodiments, setup logic may create a link by executing a system call to the host operating system on which it runs.

Figure 5:
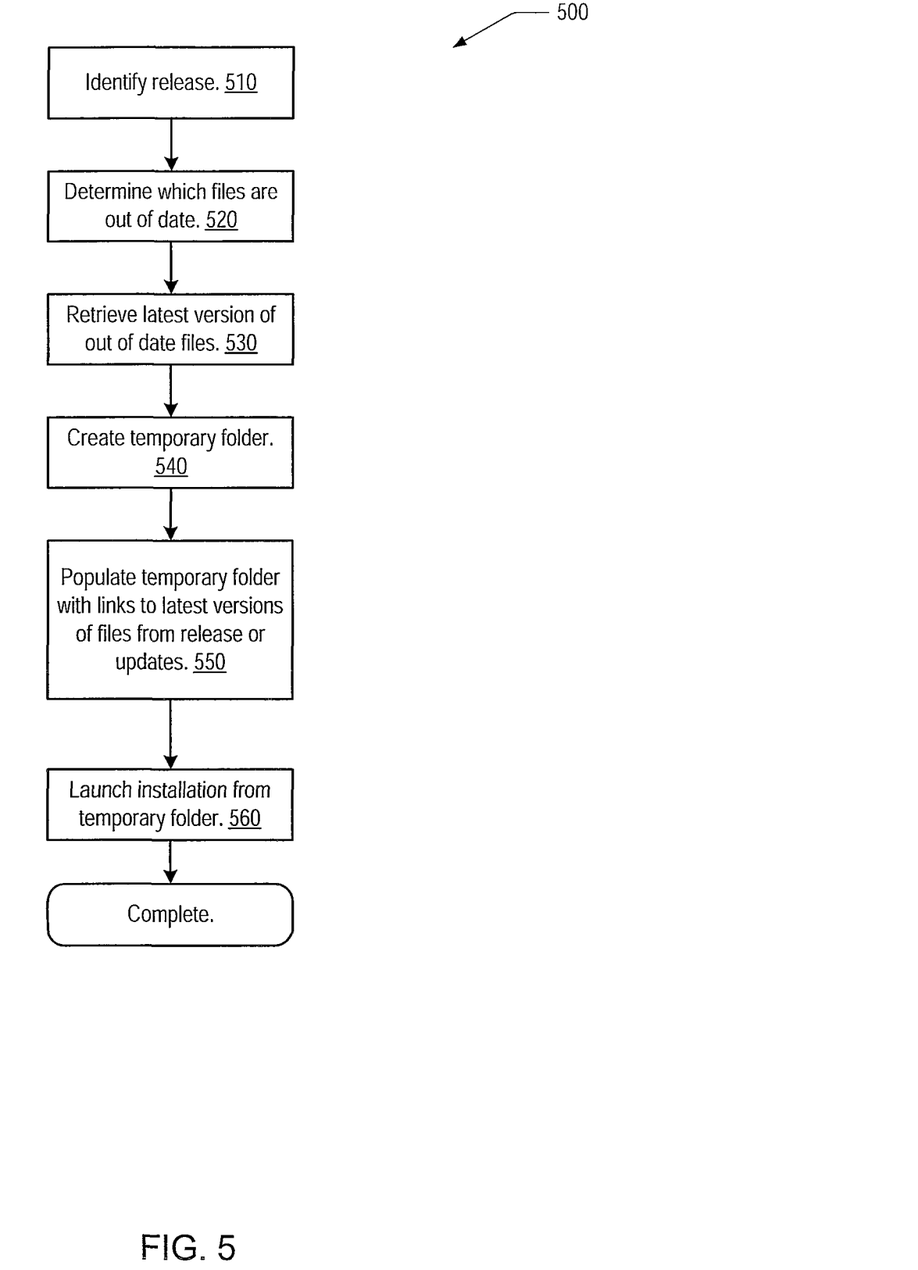
FIG. 5 illustrates one embodiment of a process that may be used to setup a software product for installation using the latest file versions.

FIG. 5 illustrates one embodiment of a process 500 that may be used to setup a software product for installation using the latest file versions. Process 500 may begin with the identification of a release of a particular software product (block 510). For example, a release may be identified as being accessible via static media, such as a CD-ROM or a DVD. Alternatively, a release may be identified in a shared location accessible via a network connection. Other methods of identifying a release will be apparent to one of ordinary skill in the art. Once a release has been identified, a determination may be made of which files in the release are up-to-date and which files are out-of-date (block 520). For instance, directory information accompanying the release may include timestamps for each file or other time-based or version information. This information may be compared to a directory of available file versions to determine which files or up-to-date. In one embodiment, a directory of available file versions may be accessible from the software product vendor via a network query. For any files that are out-of-date, the latest version may be retrieved (block 530). For example, newer versions of out-of-date files may be downloaded via the Internet from a vendor's server and stored locally. A temporary folder may then be created (block 540). The temporary folder may be populated with links to the latest versions of files to be used during installation of the particular software product (block 550). For example, if a file in the identified release was determined to be up-to-date, a link to the file may be added to the temporary directory, where the link points to the file's location on static media or in the network share, etc. If a file in the identified release was determined to be out-of-date, a link to the up-to-date, downloaded version of the file may be added to the temporary directory, where the link points to the file's local storage location. Links may be symbolic links or hard links, depending on the location of the target file and the link capabilities of the operating system on which the installation software is executing. Once the temporary folder has been populated with links to the files required for installation of the particular software product, the installation may be launched using the temporary folder (block 560) and process 500 is complete.

Figure 6:
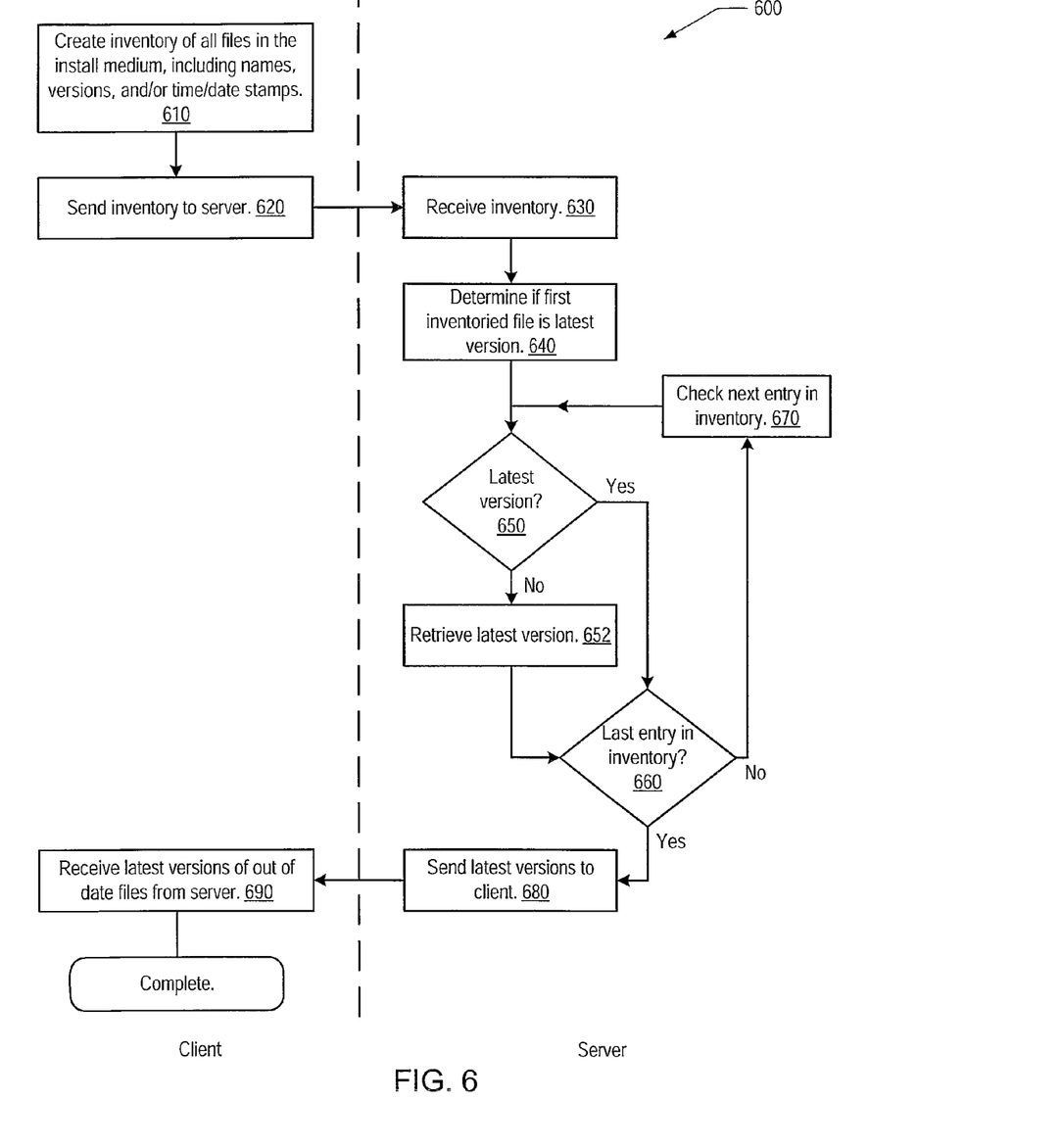
FIG. 6 illustrates one embodiment of a process that may be used to obtain the latest files versions for use in an installation of a software product.

FIG. 6 illustrates one embodiment of a process 600 that may be used to obtain the latest file versions for use in an installation of a software product. In one embodiment, process 600 may be executed by a client and a server. For example, the blocks on the left side of FIG. 6 may be executed by a client such as any of workstations 120 or laptop computers 130 as shown in FIG. 1 and the blocks on the right side of FIG. 6 may be executed by a server such as server 140 of FIG. 1. Process 600 may begin with creation of an inventory of all the files in an install medium, where the inventory includes an entry for each file. Each entry in the inventory may include one or more attributes for the corresponding file such as file names, versions, and/or time/date stamps (block 610). Once an inventory is completed, it may be sent to a server for processing (block 620). The server may receive the inventory (block 630) and for a first entry, determine if the file version to which the entry refers is the latest available (block 640). If the entry's file's version is not the latest available (decision block 650), a latest (updated) version of the corresponding file may be retrieved (block 652). Once a latest file version has been retrieved or if the entry's file's version is the latest available (decision block 650), if there are more entries in the inventory (decision block 660), a next entry may be checked (block 670). If there are no more entries in the inventory to be checked (decision block 660), the latest versions of the files for which updated versions where retrieved may be sent to the client (block 680). Once the client receives the updated versions of out-of-date files from the server (block 690), process 600 is complete.

Figure 7:
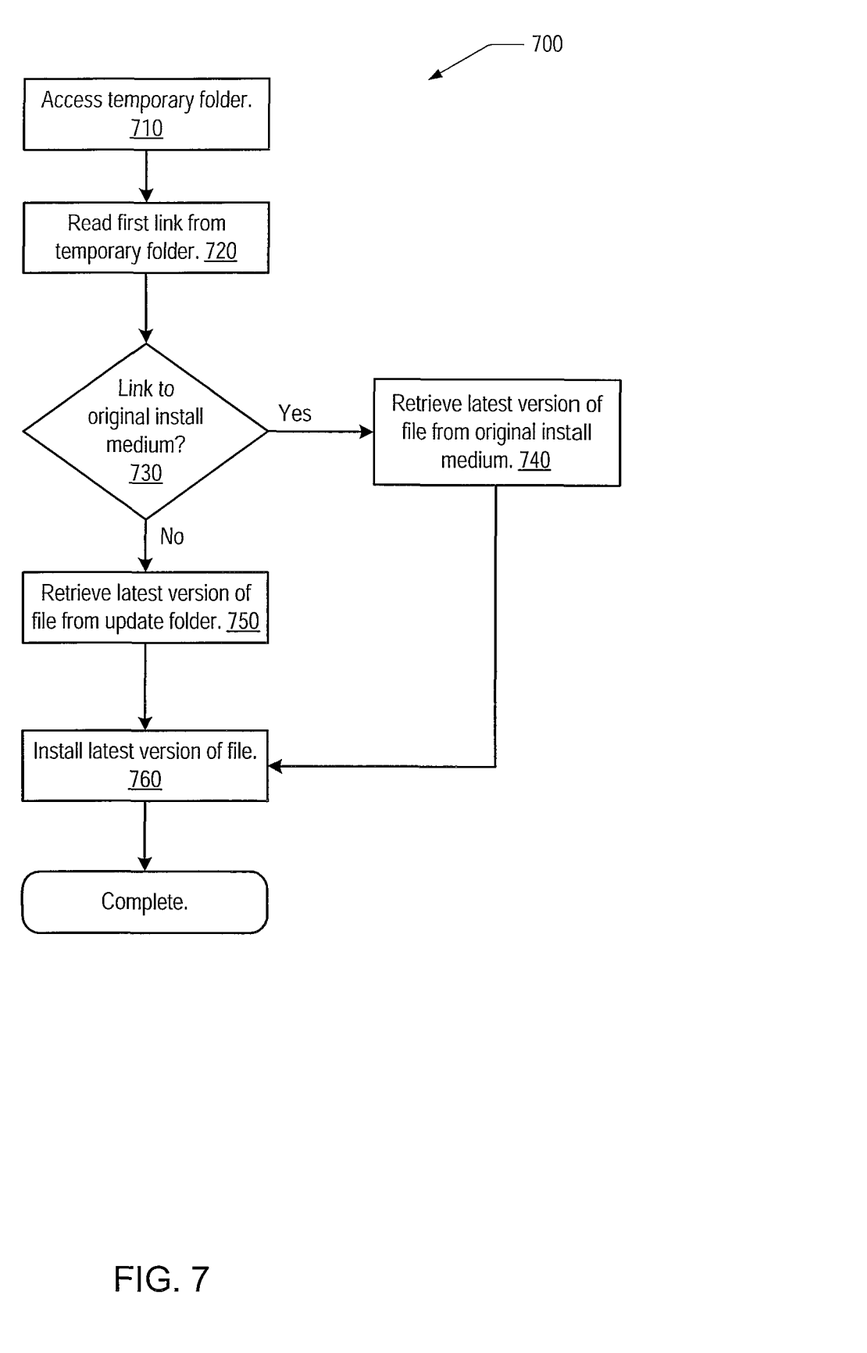

FIG. 7 illustrates one embodiment of a process 700 that may be used to install a software product using the latest file versions. Process 700 may begin by accessing a temporary folder of links to files to be used during installation of a software product (block 710). A first link in the temporary folder may then be read (block 720). If the link points to a file in the original install medium (decision block 730), the latest version of the corresponding file may be retrieved from the original install medium (block 740). If the link does not point to a file in the original install medium (decision block 730), the latest version of the corresponding file may be retrieved from another location, such as an update folder or a remote update medium (block 750). As each of the latest versions of the files is retrieved, it may be used in the installation (block 760). Process 700 may be repeated for each link in the temporary folder and once all the links in have been followed and the retrieved files installed, process 700 may be complete.

It is noted that the foregoing flow charts are for purposes of discussion only. In alternative embodiments, the elements depicted in the flow charts may occur in a different order, or in some cases concurrently. Additionally, some of the flow chart elements may not be present in various embodiments, or may be combined with other elements. All such alternatives are contemplated.

It is noted that the above-described embodiments may comprise software. In such an embodiment, the program instructions that implement the methods and/or mechanisms may be conveyed or stored on a computer readable medium. Numerous types of media which are configured to store program instructions are available and include hard disks, floppy disks, CD-ROM, DVD, flash memory, Programmable ROMs (PROM), random access memory (RAM), and various other forms of volatile or non-volatile storage.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method of installing a software product on a computer system, the method comprising:
    obtaining an installation package comprising a plurality of files of the software product;
    for each of the plurality of files, determining if there is a later file version available than a file version in the installation package;
    creating a temporary folder;
    for each respective file of the plurality of files:
        if a later version of the respective file is not available, storing a link in the temporary folder that refers to the respective file in the installation package, wherein the respective file in the installation package is in a different location than the temporary folder; and
        if a later version of the respective file is available, storing a link in the temporary folder that refers to the later version of the respective file, wherein the later version of the respective file is in a different location than the temporary folder; and
    executing an installation operation to install the software product on the computer system using links in the temporary folder, wherein for each respective link in the temporary folder, the installation operation executes to install the file referred to by the link.

2. The method as recited in claim 1, wherein the installation package is stored on a medium taken from the group comprising:
    one or more DVDs; and
    one or more CD-ROMs.

3. The method as recited in claim 1, further comprising downloading from one or more servers and storing in an update folder, a later version of only those files for which a later file version is available, wherein one or more of said links refer to later versions of files stored in the update folder.

4. The method as recited in claim 1, wherein said links comprise symbolic links.

5. The method as recited in claim 1, wherein the installation operation comprises executing an installer configured to install the software product using the links in the temporary folder.

6. The method as recited in claim 5, wherein one or more files for which a later file version is available are part of the installer.

7. The method as recited in claim 1, wherein the method does not require installation of files in the installation package for which a later file version is available.

8. A computer system having a processor comprising:
    a client coupled to at least one server;
    wherein the client is configured to:
        obtain an installation package comprising a plurality of files of a software product to be installed on the client;
        for each of the plurality of files, determine if there is a later file version available than a file version in the installation package;
        create a temporary folder;
        for each respective file of the plurality of files:
            if a later version of the respective file is not available, store a link in the temporary folder that refers to the respective file in the installation package, wherein the respective file in the installation package is in a different location than the temporary folder; and
            if a later version of the respective file is available, store a link in the temporary folder that refers to the later version of the respective file, wherein the later version of the respective file is in a different location than the temporary folder; and
        execute an installation operation to install the software product on the client using links in the temporary folder, wherein for each respective link in the temporary folder, the installation operation executes to install the file referred to by the link.

9. The computer system as recited in claim 8, wherein the installation package is stored on a medium taken from the group comprising:
    one or more DVDs; and
    one or more CD-ROMs.

10. The computer system as recited in claim 8, where the client is further configured to download from one or more servers and store in an update folder, a later version of only those files for which a later file version is available, wherein one or more of said links refer to later versions of files stored in the update folder.

11. The computer system as recited in claim 8, wherein said links comprise symbolic links.

12. The computer system as recited in claim 8, wherein the installation operation comprises an installer installing the software product using the links in the temporary folder.

13. The computer system as recited in claim 12, wherein one or more files for which a later file version is available are part of the installer.

14. The computer system as recited in claim 8, wherein installing the software product on the client does not require installation of files in the installation package for which a later file version is available.

15. A non-transitory computer readable storage medium storing computer instructions that are executable by a processor to:
    obtain an installation package comprising a plurality of files of a software product to be installed on a computer system;
    for each of the plurality of files, determine if there is a later file version available than a file version in the installation package;
    create a temporary folder;
    for each respective file of the plurality of files:
        if a later version of the respective file is not available, store a link in the temporary folder that refers to the respective file in the installation package, wherein the respective file in the installation package is in a different location than the temporary folder; and
        if a later version of the respective file is available, store a link in the temporary folder that refers to the later version of the respective file, wherein the later version of the respective file is in a different location than the temporary folder; and
    execute an installation operation to install the software product on the computer system using links in the temporary folder, wherein for each respective link in the temporary folder, the installation operation executes to install the file referred to by the link.

16. The computer readable storage medium as recited in claim 15, wherein the instructions are further executable by the processor to download from one or more servers and store in an update folder, a later version of only those files for which a later file version is available, wherein one or more of said links refer to later versions of files stored in the update folder.

17. The computer readable storage medium as recited in claim 15, wherein said links comprise symbolic links.

18. The computer readable storage medium as recited in claim 15, wherein the installation operation comprises an installer installing the software product using the links in the temporary folder.

19. The computer readable storage medium as recited in claim 18, wherein one or more files for which a later file version is available are part of the installer.

20. The computer readable storage medium as recited in claim 15, wherein installing the software product does not require installation of files in the installation package for which a later file version is available.

\* \* \* \* \*